Patented Apr. 24, 1934

1,955,890

UNITED STATES PATENT OFFICE 1,955,890

OXIDATION OF ORGANIC COMPOUNDS

Harry Lister Riley, South Kensington, England, assignor to Imperial Chemical Industries Ltd., a corporation of Great Britain No Drawing. Application February 11, 1931, Serial No. 515,142. In Great Britain February 15, 1930

6 Claims. (Cl. 260—134)

This invention relates to the conversion of organic compounds in their oxidation products and in particular to the oxidation of certain classes of substances in which a methylene ($CH_2$) or methyl ($CH_3$) group is adjacent to a carbonyl group CO, the said carbonyl group being ketonic, aldehydic or carboxylic.

This invention has as an object, therefore, an improved process for converting organic compounds into their oxidation products.

I have discovered that selenium dioxide and other selenium compounds have a specific oxidizing action upon compounds of the type disclosed herein, one or more hydrogen atoms of the group adjacent to the carbonyl group being oxidized. Thus acetone is converted with good yield into pyruvic aldehyde or its polymerides, the reaction probably taking place according to the following equation:

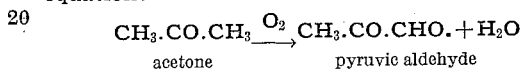
$$CH_3.CO.CH_3 \xrightarrow{O_2} CH_3.CO.CHO. + H_2O$$
acetone        pyruvic aldehyde the selenium dioxide or other selenium compound being reduced in the process to selenium.

I prefer to carry out the reaction in the presence of a diluent which may be the organic reagent itself, if the boiling product of the reagent is suitable. The temperature used is preferably from 50° C. to 150° C., but temperatures somewhat higher or lower may be used.

My invention is illustrated, but not limited, by the following examples in which the parts are by weight:

Example 1

One thousands parts of rectified acetone are boiled under reflux with 200 parts of technical selenium dioxide until reduction of the selenium dioxide is complete. The excess of acetone is removed by distillation and the remaining liquid is separated from the selenium. The liquid is then distiller under reduced pressure, when a good yield of pyruvic aldehyde is obtained.

In a similar manner methyl ethyl ketone yields a mixture of diacetyl and ethylglyoxal, and diethyl ketone gives acetylpropionyl, i. e. $\beta\gamma$-diketo-n-pentane.

In a similar manner acetophenone is oxidized to phenylglyoxal as indicated in the following example:

Example 2

One hundred parts of acetophenone are heated with 30 parts of selenium dioxide at about 120° for several hours. The mixture is extracted with about 200 parts of boiling water, and the extract allowed to cool, whereupon hydrated phenylgloxal separates.

Similarly from propiophenone acetylbenzoyl is obtained.

Cyclic ketone such as cyclopentanone and cyclohexanone are converted in a similar manner into cyclic o-diketones.

Amongst other applications of my invention I may mention the conversion of acetaldehyde or paraldehyde into glyoxal or its polymerides, propionaldehyde into methylglyoxal, butyraldehyde into ethylglyoxal, phenylacetaldehyde into phenylglyoxal, ethyl malonate into ethyl mexoxalate or its hydrate, and ethyl acetoacetate into ethyl $\alpha\beta$-diketobutyrate.

The reaction in some cases is vigorous or the initial compound presents more than one point of attack. In such cases it is found desirable to use a large excess of the initial compound as diluent, or to add an inert solvent such as dry alcohol. The presence of water often tends to increase the vigour of the reaction.

In all these reactions the selenium produced usually separates as a viscous mass from which the reaction liquid may easily be decanted. The crude selenium may be burned to selenium dioxide, e. g. by heating it in an atmosphere or current of oxygen or of oxygen and nitrous fumes; or the selenium may be purified by washing it with alcohol or ether, drying it at about 95° C. and subliming it.

While the preferred selenium compound for carrying out the invention is selenium dioxide, other compounds derived from it such as selenious acid and selenites in general may be used. It is to be understood, therefore, that it is compounds of this class that are intended to be comprehended in the claims under the term "oxygen containing selenium compound".

As many apparently widely different embodiments of this invention may be made without departing from the spirit and scope thereof, it is to be understood that I do not limit myself to the specific embodiments thereof except as defined in the appended claims.

I claim:

1. A process for oxidizing carbonyl containing compounds which comprises heating an oxidizing agent consisting of an oxygen containing selenium compound with a carbonyl containing compound to at least the temperature at which the selenium in said selenium compound is reduced to the element in the presence of the carbonyl compound, said carbonyl compound being selected from the class consisting of ketones having a methyl or methylene group adjacent the keto-carbonyl, aldehydes having a methyl or methylene group adjacent to aldehyde carbonyl, and ethyl malonate, and thereby oxidizing said methyl or methylene groups without disrupting the carbon chain.

2. The process set forth in claim 1 in which the oxygen containing selenium compound is one of the class of such compounds consisting of selenium dioxide, selenious acid and selenites.

3. A process for oxidizing carbonyl containing compounds which comprises heating at a temperature of about 50° C. to 150° C. an oxidizing agent consisting of an oxygen containing selenium compound with a carbonyl containing compound selected from the class consisting of ketones having a methyl or methylene group adjacent to keto-carbonyl, aldehydes having a methyl or methylene group adjacent to aldehyde carbonyl, and ethyl malonate.

4. The process set forth in claim 3 in which the oxygen containing selenium compound is one of the class of such compounds consisting of selenium dioxide, selenious acid and selenites.

5. A process for oxidizing carbonyl containing compounds to compounds having the same number of carbon atoms including one additional carbonyl group which comprises heating an oxidizing agent consisting of an oxygen containing selenium compound with a ketone having a methyl or a methylene group adjacent the keto-carbonyl to at least the temperature at which the selenium in said selenium compound is reduced to the element in the presence of the ketone, and thereby oxidizing said methyl or methylene group without disrupting the carbon chain.

6. A process for oxidizing carbonyl containing compounds to compounds having the same number of carbon atoms including one additional carbonyl group which comprises heating an oxidizing agent consisting of an oxygen containing selenium compound with an aldehyde having a methyl or a methylene group adjacent to the aldehyde-carbonyl to at least the temperature at which the selenium in said selenium compound is reduced to the element in the presence of the aldehyde, and thereby oxidizing said methyl or methylene group without disrupting the carbon chain.

HARRY LISTER RILEY.